(12) United States Patent
Cho et al.

(10) Patent No.: US 10,868,312 B2
(45) Date of Patent: Dec. 15, 2020

(54) CARRIER-NANOPARTICLE COMPLEX, PREPARATION METHOD THEREFOR, AND MEMBRANE ELECTRODE ASSEMBLY INCLUDING SAME

(71) Applicant: LG CHEM, LTD., Seoul (KR)

(72) Inventors: Jun Yeon Cho, Daejeon (KR); Sang Hoon Kim, Daejeon (KR); Gyo Hyun Hwang, Daejeon (KR); Kwanghyun Kim, Daejeon (KR); Ran Choi, Daejeon (KR); Wonkyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 280 days.

(21) Appl. No.: 15/742,149

(22) PCT Filed: Sep. 22, 2016

(86) PCT No.: PCT/KR2016/010577
§ 371 (c)(1),
(2) Date: Jan. 5, 2018

(87) PCT Pub. No.: WO2017/052222
PCT Pub. Date: Mar. 30, 2017

(65) Prior Publication Data
US 2018/0198135 A1    Jul. 12, 2018

(30) Foreign Application Priority Data
Sep. 25, 2015 (KR) .......................... 10-2015-0137015

(51) Int. Cl.
*H01M 4/92* (2006.01)
*H01M 8/1004* (2016.01)
(Continued)

(52) U.S. Cl.
CPC ............. *H01M 4/926* (2013.01); *H01M 4/92* (2013.01); *H01M 4/921* (2013.01);
(Continued)

(58) Field of Classification Search
CPC ......... H01M 4/926; H01M 4/92; H01M 4/921
See application file for complete search history.

(56) References Cited

U.S. PATENT DOCUMENTS 7,229,942 B2    6/2007 Suh et al.
9,203,095 B2    12/2015 Roh et al.
(Continued)

FOREIGN PATENT DOCUMENTS

CN    103041823 A  *  4/2013
KR    20050094501 A *  9/2005    .............. B01J 31/08
(Continued)

OTHER PUBLICATIONS

Chen et al., CN-103041823-A, English Machine Translation, pp. 1-12. (Year: 2013).*
(Continued)

*Primary Examiner* — Tae-Sik Kang
(74) *Attorney, Agent, or Firm* — Birch, Stewart, Kolasch & Birch, LLP

(57) ABSTRACT

The present specification relates to a carrier-nanoparticle complex, a preparation method therefor, and a membrane electrode assembly including the same.

17 Claims, 9 Drawing Sheets

(51) Int. Cl.
 *H01M 8/1023* (2016.01)
 *H01M 8/1039* (2016.01)
 *H01M 8/1018* (2016.01)

(52) U.S. Cl.
 CPC ....... *H01M 8/1004* (2013.01); *H01M 8/1023* (2013.01); *H01M 8/1039* (2013.01); *H01M 2008/1095* (2013.01)

(56) References Cited

U.S. PATENT DOCUMENTS 9,517,460 B2 12/2016 Cho et al.
2015/0333336 A1* 11/2015 Cho ................... B01J 37/16
 429/524

FOREIGN PATENT DOCUMENTS

| KR | 10-0953545 B1 | 4/2010 | | |
|---|---|---|---|---|
| KR | 10-2013-0081130 A | 7/2013 | | |
| KR | 10-2013-0123217 A | 11/2013 | | |
| KR | 10-2014-0010772 A | 1/2014 | | |
| KR | 10-2014-0065686 A | 5/2014 | | |
| KR | 20140065686 A | * | 5/2014 | |
| KR | 10-2014-0065368 A | 7/2014 | | |
| WO | WO-2013168912 A1 | * | 11/2013 | .......... H01M 4/8657 |

OTHER PUBLICATIONS

Suh et al., KR-20050094501-A, English Machine Translation, pp. 1-16. (Year: 2005).*
Lim et al., KR-20140065686-A, English Machine Translation, pp. 1-8. (Year: 2014).*
European Search Report for Appl. No. 16848947.4 dated Jul. 4, 2018.
International Search Report (PCT/ISA/210) issued in PCT/KR2016/010577, dated Jan. 3, 2017.
Wang et al., "Multimetallic Au-FePt3 Nanoparticles as Highly Durable Electrocatalyst", Nano Letters 2011, vol. 11, No. 3, pp. 919-926.
Zhang et al., "Carbon nanotubes decorated with Pt nanoparticles via electrostatic self-assembly: a highly active oxygen reduction electrocatalyst", J. Mater. Chem., vol. 20, 2010, pp. 2826-2830 (5 pages).

* cited by examiner

[Figure 1]
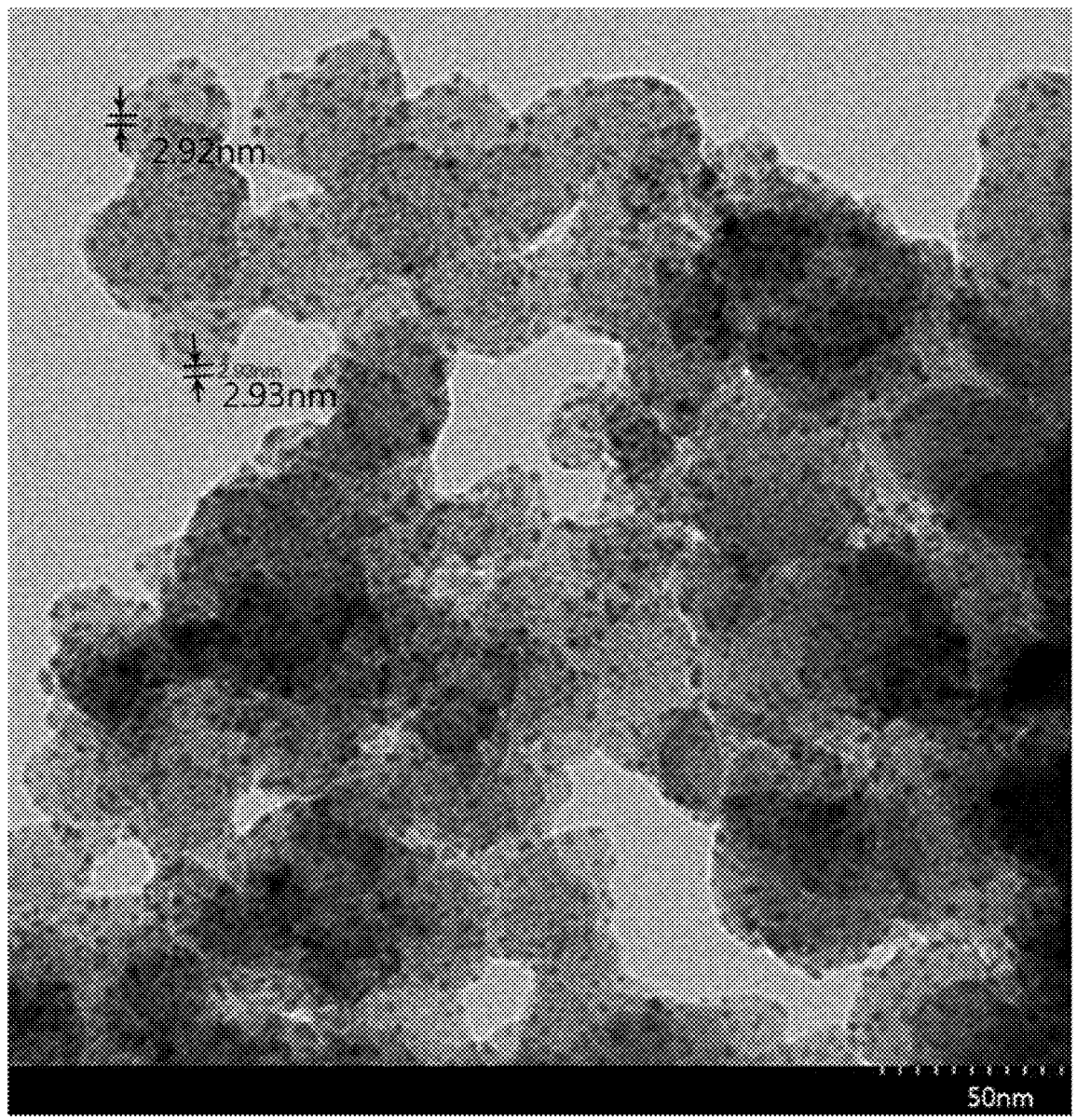

[Figure 2]
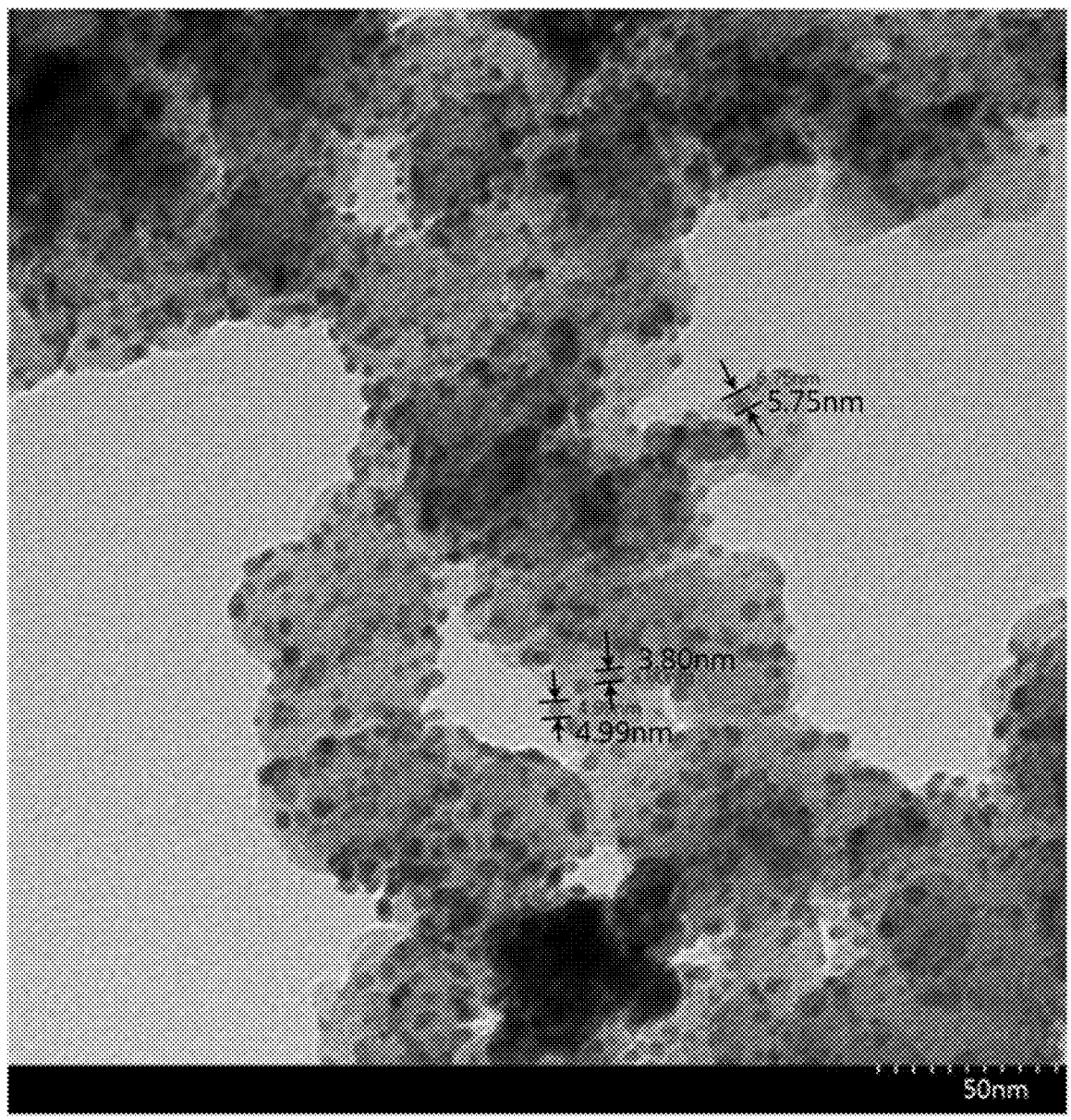

[Figure 3]
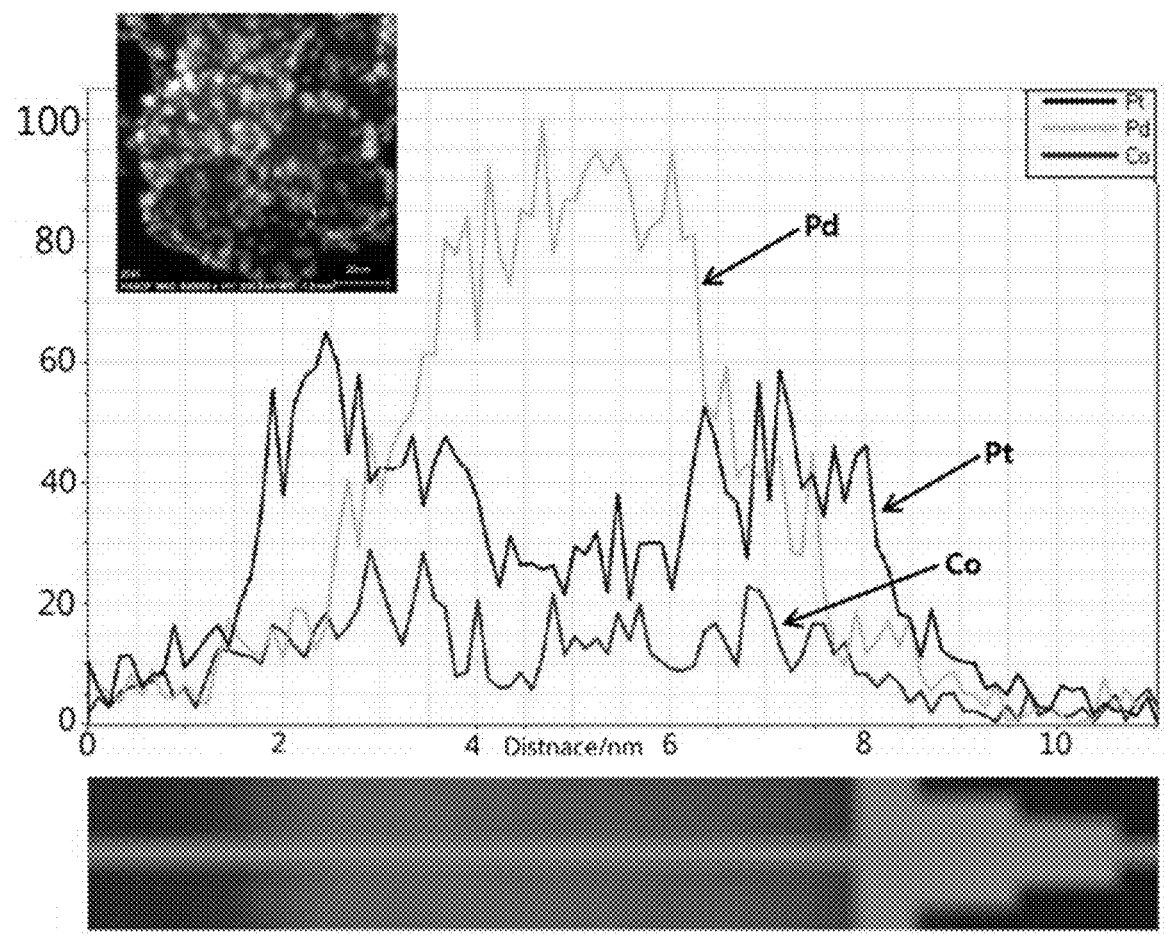

[Figure 4]
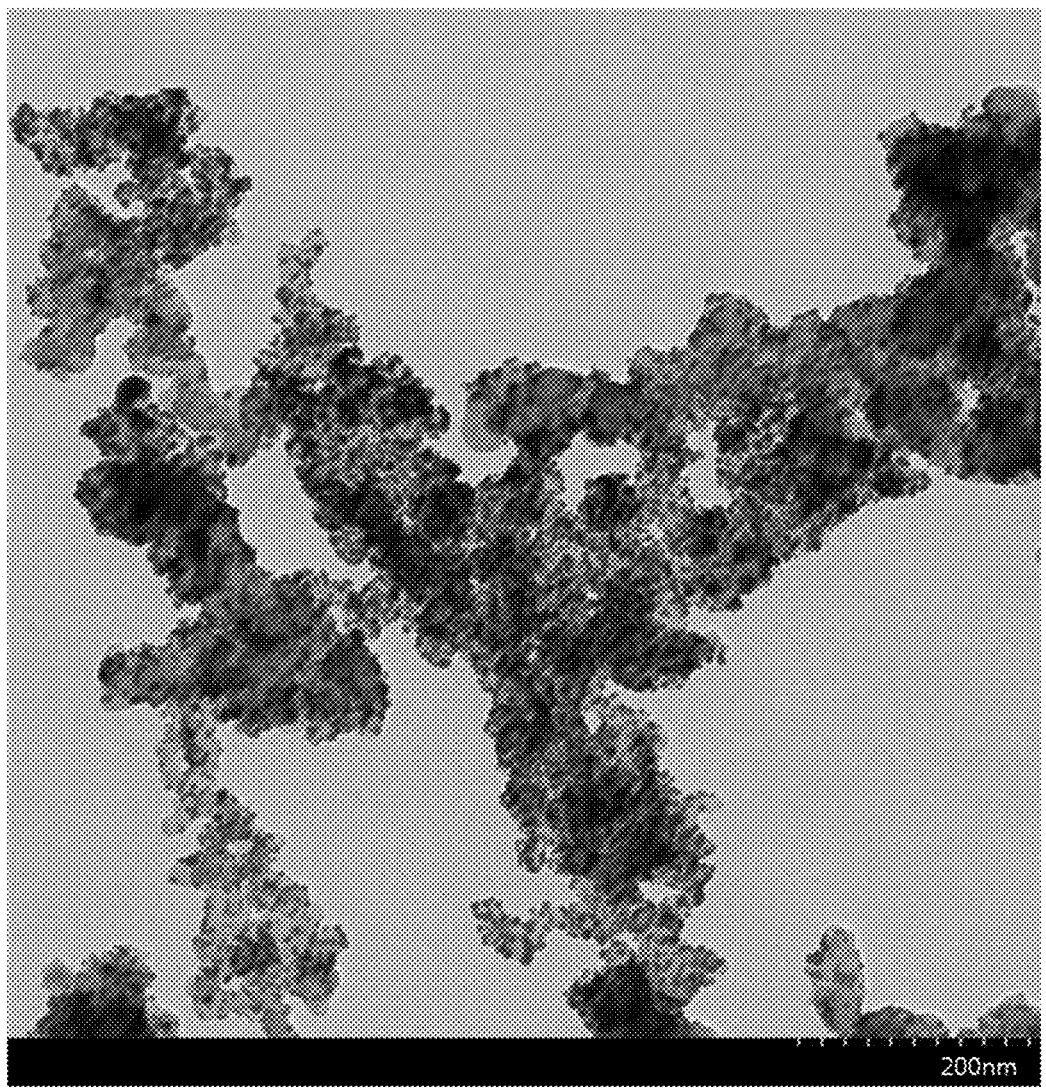

[Figure 5]
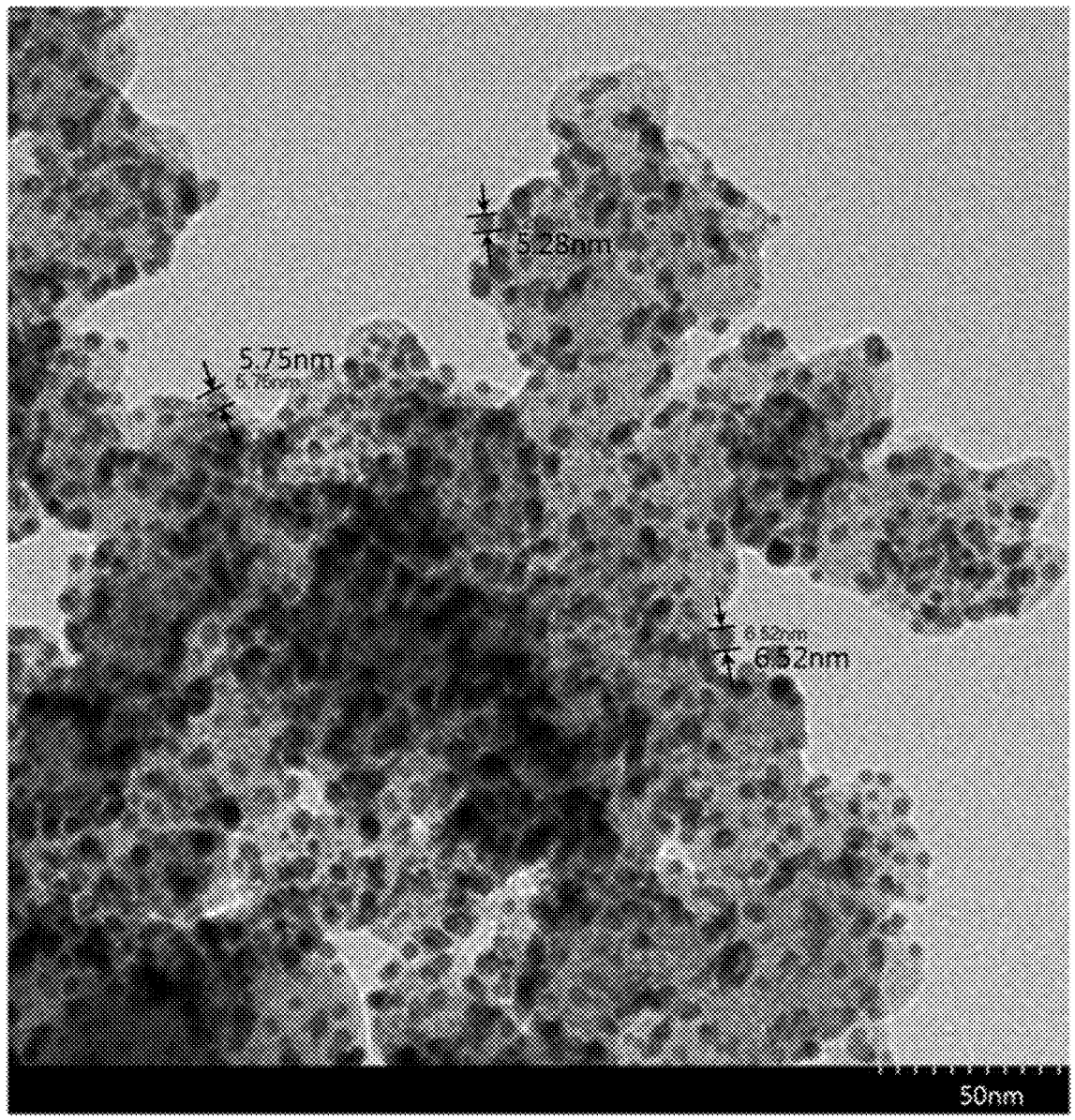

[Figure 6]
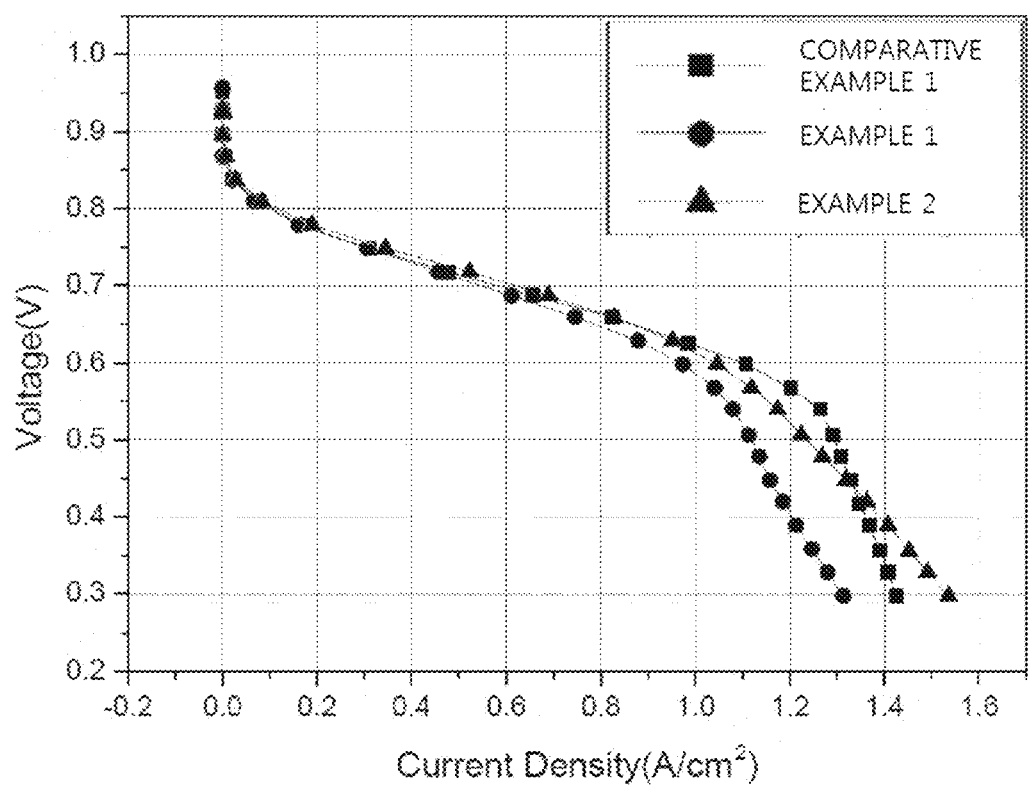

[Figure 7]
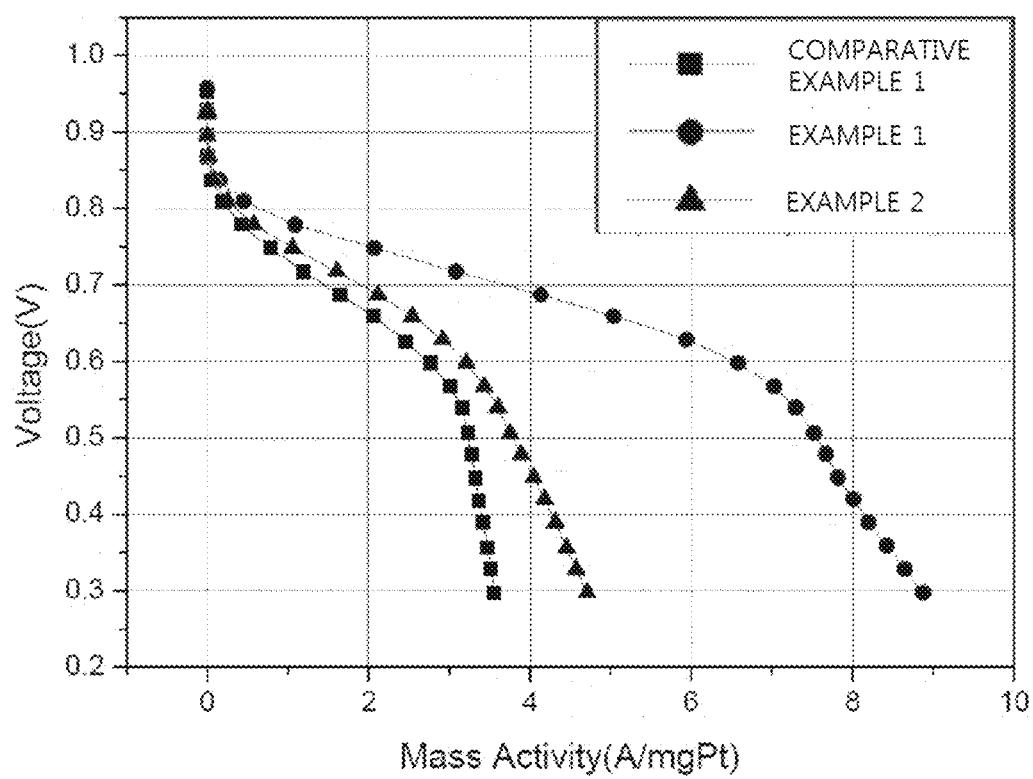

[Figure 8]
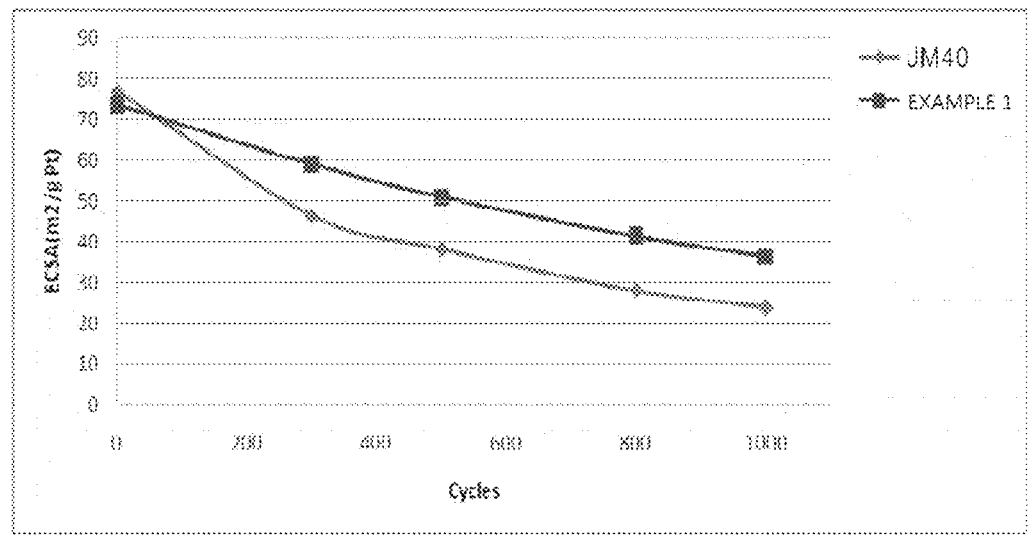
[Figure 9]
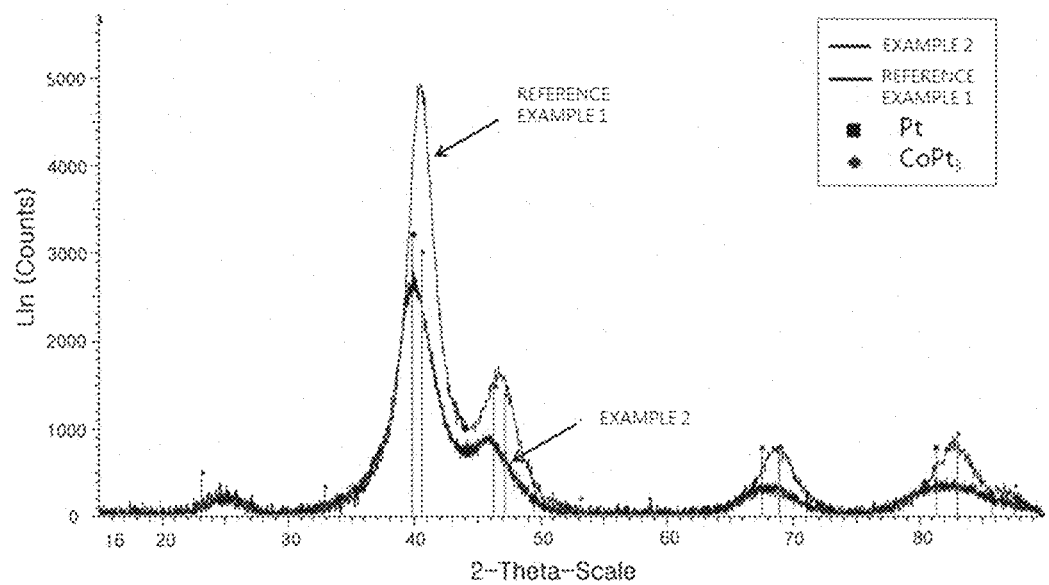

[Figure 10]
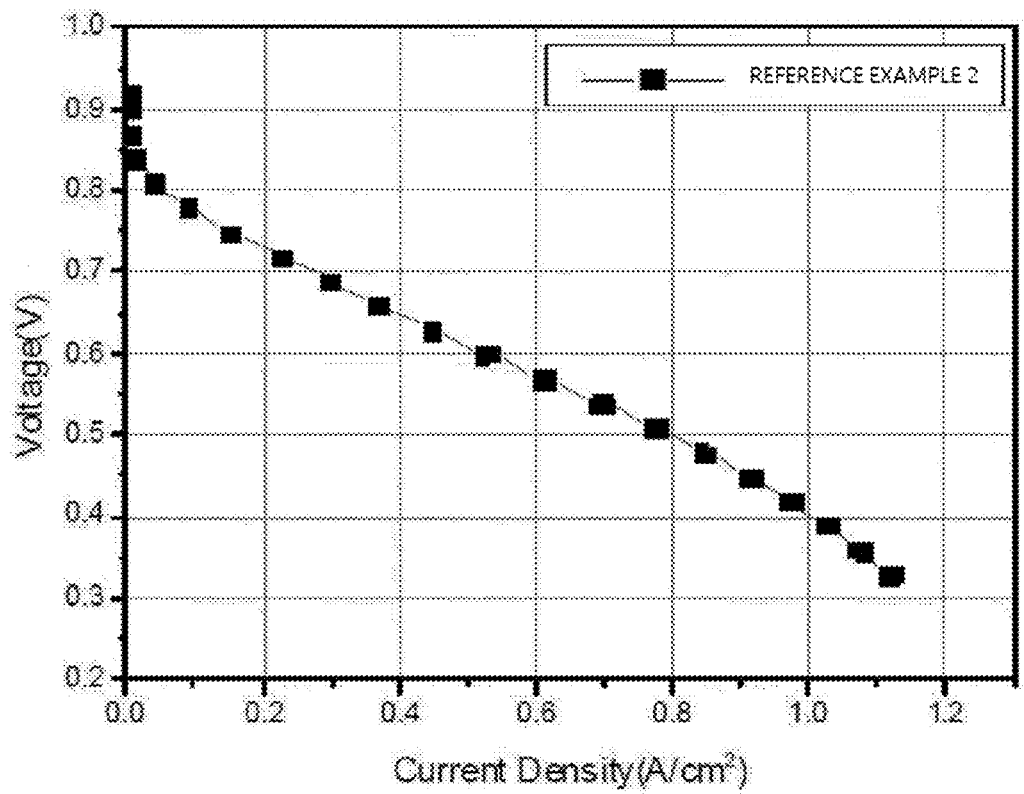
[Figure 11]
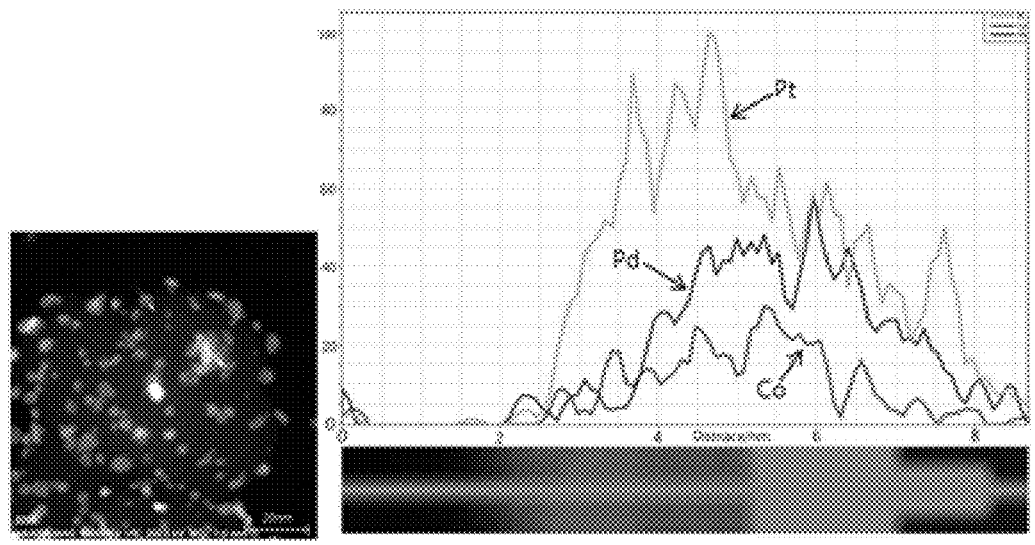

CARRIER-NANOPARTICLE COMPLEX, PREPARATION METHOD THEREFOR, AND MEMBRANE ELECTRODE ASSEMBLY INCLUDING SAME

TECHNICAL FIELD

This application claims priority to and the benefit of Korean Patent Application No. 10-2015-0137015 filed in the Korean Intellectual Property Office on Sep. 25, 2015, the entire contents of which are incorporated herein by reference.

The present specification relates to a carrier-nanoparticle complex, a preparation method therefor, and a membrane electrode assembly including the same.

BACKGROUND ART

Nanoparticles are particles having nanoscale particle sizes, and show optical, electrical and magnetic properties completely different from those of bulk materials due to a large specific surface area and the quantum confinement effect, in which energy required for electron transfer changes depending on the size of material. Accordingly, due to such properties, much interest has been concentrated on the applicability of nanoparticles in the catalyst, electromagnetic, optical, medical fields, and the like. Nanoparticles may be considered as intermediates between bulks and molecules, and may be synthesized in terms of two approaches, that is, the "top-down" approach and the "bottom-up" approach.

Examples of a method for synthesizing a metal nanoparticle include a method for reducing metal ions in a solution by using a reducing agent, a method for using gamma-rays, an electrochemical method, and the like, but in the existing methods, it is difficult to synthesize nanoparticles having a uniform size and shape, or it is difficult to economically mass-produce high-quality nanoparticles for various reasons such as problems of environmental contamination, high costs, and the like by using organic solvents.

Meanwhile, [Nano Lett., 2011, 11(3), pp 919-926] describes a method for preparing a core-shell particle including gold (Au) as a core and platinum (Pt) as a shell, but only discloses a method for preparing a core-shell particle by using platinum (Pt)-acetylacetonate ($Pt-(acac)_2$), which is an organic metal compound, and an organic solvent, and does not describe a method for preparing a core-shell particle, which may solve environmental pollution and high cost problems.

Thus, there is a need for studies on preparing core-shell particles capable of minimizing environmental pollution and being mass produced.

DETAILED DESCRIPTION OF THE INVENTION

Technical Problem

The present specification has been made in an effort to provide a carrier-nanoparticle complex, a preparation method therefor, and a membrane electrode assembly including the same.

Technical Solution

An exemplary embodiment of the present specification provides a method for preparing a carrier-nanoparticle complex in which core-shell nanoparticles are supported on a carrier, the method including: preparing a carbon carrier having a portion or all of the surface thereof coated with a polymer including a cationic functional group; forming core particles by reducing a solution including one or two or more metal precursors, the carbon carrier, and a polyol at a temperature of 120° C. or more and 220° C. or less to form metal core particles supported on the carbon carrier; and forming core-shell nanoparticles by reducing an aqueous solution including metal core particles supported on the carbon carrier, a Pt precursor, and water at a temperature of 20° C. or more and 100° C. or less to form a Pt shell on a portion or all of the metal core particle surface.

An exemplary embodiment of the present specification provides a carrier-nanoparticle complex prepared by the preparation method.

An exemplary embodiment of the present specification provides a membrane electrode assembly including an electrode catalyst layer which includes the carrier-nanoparticle complex and an electrolyte membrane.

An exemplary embodiment of the present specification provides a fuel cell including the membrane electrode assembly.

Advantageous Effects

A method for preparing a carrier-nanoparticle complex according to an exemplary embodiment of the present specification does not use an organic solvent which is highly likely to cause environmental pollutions, but uses an aqueous solvent, and thus has an advantage in that there is little environmental pollution.

A method for preparing a carrier-nanoparticle complex according to an exemplary embodiment of the present specification can prepare a carrier-nanoparticle complex at high yield through a simple process.

The method for preparing a carrier-nanoparticle complex according to an exemplary embodiment of the present specification is carried out at a low temperature of 200° C. or less, and thus has an advantage in that the carrier-nanoparticle complex may be prepared in large amounts at a low cost.

A carrier-nanoparticle complex according to an exemplary embodiment of the present specification may implement high catalytic activity because core-shell nanoparticles with a uniform size are uniformly supported on a carrier.

The method for preparing a carrier-nanoparticle complex according to an exemplary embodiment of the present specification does not use a surfactant, and thus has an advantage in that hazardous materials are generated in small amounts in the preparation process, and the carrier-nanoparticle complex may be easily formed at a low cost.

BRIEF DESCRIPTION OF DRAWINGS

FIG. 1 illustrates an electron microscope photograph of Pd/Co core particles supported on a carbon carrier, which are prepared according to Example 1.

FIG. 2 illustrates an electron microscope photograph of a carrier-nanoparticle complex in which core-shell nanoparticles are supported on the carbon carrier, which is prepared according to Example 1.

FIG. 3 illustrates component analysis results of the core-shell nanoparticles of the carrier-nanoparticle complex, which is prepared according to Example 1, by using STEM EDS.

FIG. 4 illustrates an electron microscope photograph of Pd/Co core particles supported on a carbon carrier, which are prepared according to Example 2.

FIG. 5 illustrates an electron microscope photograph of a carrier-nanoparticle complex in which core-shell nanoparticles are supported on the carbon carrier, which is prepared according to Example 2.

FIG. 6 illustrates a current density-voltage graph of Comparative Example 1, Example 1, and Example 2.

FIG. 7 is a normalization graph based on the amount of Pt per unit area in the graph in FIG. 6.

FIG. 8 illustrates a graph of the catalyst durability evaluation performed by cyclic voltammetry in Example 1 and Comparative Example 1.

FIG. 9 illustrates XRD results of Example 2 and Reference Example 1.

FIG. 10 illustrates a current density-voltage graph of Reference Example 2.

FIG. 11 illustrates component analysis results of the core-shell nanoparticles of the carrier-nanoparticle complex, which is prepared according to Comparative Example 2, by using STEM EDS.

BEST MODE

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

Hereinafter, the present specification will be described in more detail.

An exemplary embodiment of the present specification provides a method for preparing a carrier-nanoparticle complex in which core-shell nanoparticles are supported on a carrier, the method including: preparing a carbon carrier having a portion or all of the surface thereof coated with a polymer including a cationic functional group; forming core particles by reducing a solution including one or two or more metal precursors, the carbon carrier, and a polyol at a temperature of 120° C. or more and 220° C. or less to form metal core particles supported on the carbon carrier; and forming core-shell nanoparticles by reducing an aqueous solution including metal core particles supported on the carbon carrier, a Pt precursor, and water at a temperature of 20° C. or more and 100° C. or less to form a Pt shell on a portion or all of the metal core particle surface.

According to an exemplary embodiment of the present specification, the core-shell nanoparticle may include a shell including Pt on at least a portion of a surface of a core particle including one or two or more metals. Specifically, according to an exemplary embodiment of the present specification, the core-shell nanoparticle may include a shell including Pt on at least a portion of a surface of a core particle including two metals.

A precursor in the present specification means a salt including metal ions. The precursor may be dissociated in a solvent to provide metal ions, and the metal ion is reduced by a reducing agent, and thus may become a metal constituting the core-shell nanoparticle.

Preparing of Carbon Carrier

According to an exemplary embodiment of the present specification, the preparing of the carbon carrier may include providing a carbon carrier having a portion or all of the surface thereof coated with a polymer including a cationic functional group.

According to an exemplary embodiment of the present specification, the polymer including the cationic functional group may include one or more functional groups selected from the group consisting of an amine group, an imine group, and a phosphine group. The cationic functional group may be a primary, secondary, tertiary, or quaternary functional group.

According to an exemplary embodiment of the present specification, the polymer including the cationic functional group may be a polymer in which a straight or branched hydrocarbon chain is substituted with the cationic functional group.

Further, the skeleton of the polymer including the cationic functional group may be a straight or branched hydrocarbon chain which does not include a cyclic molecule.

In the present specification, the hydrocarbon chain may be one or two or more combinations of a saturated hydrocarbon and an unsaturated hydrocarbon. For example, the straight or branched hydrocarbon chain may be a straight or branched hydrocarbon chain in which carbon atoms between a saturated hydrocarbon and an unsaturated hydrocarbon are linked in the form of straight or branched chains, or a straight or branched hydrocarbon chain in which carbon atoms between a saturated hydrocarbon and a saturated hydrocarbon are linked in the form of straight or branched chains.

According to an exemplary embodiment of the present specification, the polymer including the cationic functional group may have a weight average molecular weight of 500 g/mol or more and 1,000,000 g/mol or less. Specifically, the polymer including the cationic functional group may have a weight average molecular weight of 1,000 g/mol or more and 10,000 g/mol or less.

When the weight average molecular weight of the polymer including the cationic functional group satisfies the range, the carbon carrier is easily coated, and the residual polymer after the coating is easily washed.

According to an exemplary embodiment of the present specification, the polymer including the cationic functional group may include one or more selected from the group consisting of polyallylamine hydrochloride (PAH), polyethylene imine (PEI), and an allylamine amidesulfate polymer. The polymer may be branched.

According to an exemplary embodiment of the present specification, the core-shell nanoparticles may form a bonding structure with the cationic functional group.

The cationic functional group may be bonded to the core-shell nanoparticles to alleviate aggregation of the core-shell nanoparticles, thereby increasing dispersibility of the core-shell nanoparticles. Furthermore, the N or P functional group of the cationic functional group and the core-shell nanoparticles may be bonded to each other to form a composite of the polymer and the core-shell nanoparticles, and the composite serves to increase the binding force of the carbon carrier and the core-shell nanoparticles, and may enhance durability of the carrier-nanoparticle complex.

According to an exemplary embodiment of the present specification, the carrier may be a carbon-based carrier.

Specifically, according to an exemplary embodiment of the present specification, the carbon-based carrier may include one or more selected from the group consisting of carbon black, carbon nanotube (CNT), graphite, graphene, activated carbon, mesoporous carbon, carbon fiber, and carbon nano wire.

Forming of Core Particles

An exemplary embodiment of the present specification may include forming core particles by reducing a solution including one or two or more metal precursors, the carbon carrier, and a polyol at a temperature of 120° C. or more and 220° C. or less to form metal core particles supported on the carbon carrier.

According to an exemplary embodiment of the present specification, the solution may include one or two metal precursors.

The polyol means a polyhydric alcohol including two or more hydroxyl groups. Specifically, as the polyol, ethylene glycol, propylene glycol, and the like may be applied. However, the polyol is not limited thereto.

In the forming of the core particles, when a polyol is used as a solvent, there is an advantage in that core particles having a small particle diameter of 7 nm or less may be uniformly supported.

According to an exemplary embodiment of the present specification, the metal precursor may be ionized in a polyol.

According to an exemplary embodiment of the present specification, in the forming of the core particles, the metal precursor may be a precursor of one or more metals selected from the group consisting of Co, Ni, Fe, Pd, Ru, Cr, and Cu.

According to an exemplary embodiment of the present specification, the metal precursor may be a precursor of two or more different metals. Specifically, the metal precursor may be a nitrate ($NO_3^-$), a halide, a hydroxide ($OH^-$) or a sulfate ($SO_4^-$) of the metal.

According to an exemplary embodiment of the present specification, the halide may be chloride ($Cl^-$), bromide ($Br^-$), or iodide ($I^-$).

The content of the metal precursor may be appropriately adjusted according to the amount of core particles to be supported on the carrier.

According to an exemplary embodiment of the present specification, the forming of the core particles may include adjusting pH of the solution to 9 or more and 11 or less.

According to an exemplary embodiment of the present specification, in the process of adjusting the pH, the pH may be adjusted by adding a base solution. Specifically, the pH may be adjusted by adding a base solution selected from the group consisting of sodium hydroxide (NaOH), barium hydroxide ($Ba(OH)_2$), potassium hydroxide (KOH), calcium hydroxide ($Ca(OH)_2$), and lithium hydroxide (LiOH).

The metal core particles may be bonded to the cation of the polymer including the cationic functional group.

The preparation method according to an exemplary embodiment of the present specification has an advantage in that a process of supporting nanoparticles on a carrier is not separately needed. Specifically, since the forming of the core particles is performed by a one-pot process, a separate supporting process is not needed. When a carrier-nanoparticle complex is prepared while together including a carrier during the process of forming nanoparticles as described above, there is an advantage in that the adhesion between the carrier and the nanoparticles and the dispersity are excellent.

When the adhesion between the carrier and the nanoparticles is excellent, there is an advantage in that the durability may be improved because the interaction between the nanoparticles and the carrier is improved. Further, when the dispersity of nanoparticles is excellent on the carrier, there is an effect in that the reactivity is improved because the number of active points which may participate in reactions is increased.

According to an exemplary embodiment of the present specification, the forming of the core particles includes performing reduction at a temperature of 120° C. or more and 220° C. or less. Specifically, the forming of the core particles may not include a separate reducing agent. Furthermore, within the temperature range, the polyol is changed into an aldehyde, and may reduce the metal precursor.

According to an exemplary embodiment of the present specification, in the forming of the core particles, the content of the core particles may be 10 wt % or more and 50 wt % or less, or 10 wt % or more and 40 wt % or less, based on the total mass of the carrier and the core particles. Specifically, the content of the core particles may be 10 wt % or more and 20 wt % or less, or 10 wt % or more and 15 wt % or less, based on the total mass of the carrier and the core particles.

Forming of Core-Shell Nanoparticles

An exemplary embodiment of the present specification may include forming core-shell nanoparticles by reducing an aqueous solution including metal core particles supported on the carbon carrier, a Pt precursor, and water at a temperature of 20° C. or more and 100° C. or less to form a Pt shell on a portion or all of the metal core particle surface.

According to an exemplary embodiment of the present specification, the forming of the core-shell nanoparticles may include adjusting pH of the aqueous solution to 8 or more and 11 or less.

According to an exemplary embodiment of the present specification, in the process of adjusting the pH, the pH may be adjusted by adding a base solution. Specifically, the pH may be adjusted by adding a base solution selected from the group consisting of sodium hydroxide (NaOH), barium hydroxide ($Ba(OH)_2$), potassium hydroxide (KOH), calcium hydroxide ($Ca(OH)_2$), and lithium hydroxide (LiOH).

According to an exemplary embodiment of the present specification, the forming of the core-shell nanoparticles may include performing reduction at a temperature of 20° C. or more and 30° C. or less. Specifically, according to an exemplary embodiment of the present specification, since the forming of the core-shell nanoparticles may be performed in a normal temperature range, there is an advantage in that high costs are not needed to meet the process conditions.

According to an exemplary embodiment of the present specification, in the forming of the core-shell nanoparticles, the Pt precursor may be represented by the following Chemical Formula 1.

$$PtA_mB_n \qquad \text{[Chemical Formula 1]}$$

In Chemical Formula 1,
A is ($NH_3$), ($CH_3NH_2$), or ($H_2O$),
B is a monovalent anion,
m is 2, 4, or 6, and
n is any one integer of 1 to 7.

According to an exemplary embodiment of the present specification, B may be $NO_3^-$, $NO_2^-$, $OH^-$, $F^-$, $Cl^-$, $Br^-$, or $I^-$.

According to an exemplary embodiment of the present specification, the Pt precursor may be $Pt(NH_3)_4(NO_3)_2$, $Pt(NH_3)_4Cl_2$, $Pt(CH_3NH_2)_4(NO_3)_2$, $Pt(CH_3NH_2)_4Cl_2$, $Pt(H_2O)_4(NO_3)_2$, or $Pt(H_2O)_4Cl_2$.

According to an exemplary embodiment of the present specification, in the forming of the core-shell nanoparticles, the aqueous solution may further include a reducing agent.

According to an exemplary embodiment of the present specification, the reducing agent is not particularly limited as long as the reducing agent is each a strong reducing agent having a standard reduction potential of −0.23 V or less, and has a reducing power which may reduce the dissolved metal ions to be precipitated as metal particles.

According to an exemplary embodiment of the present specification, the reducing agent may be each at least one selected from the group consisting of $NaBH_4$, $NH_2NH_2$, $LiAlH_4$, and $LiBEt_3H$.

An exemplary embodiment of the present specification may further include subjecting the core particles to heat treatment at a temperature of 150° C. or more and 400° C. or less, or 180° C. or more and 300° C. or less prior to the forming of the core-shell nanoparticles.

The subjecting of the core particles to heat treatment may contribute to improvement in durability of the core-shell nanoparticles by subjecting core particles to heat treatment prior to forming a shell portion to enhance the durability of the core particles. Furthermore, since the subjecting of the core particles to heat treatment may also serve to remove the remaining solvent in the forming of the core particles, core-shell nanoparticles having excellent performance may be prepared.

For reference, when the heat treatment is performed after the forming of the core-shell nanoparticles, the structure of the shell is collapsed, and as a result, performance of the core-shell nanoparticles may significantly deteriorate.

According to an exemplary embodiment of the present specification, each step may not use a surfactant.

According to an exemplary embodiment of the present specification, each step of the preparation method does not use a surfactant, and thus has an effect of reducing costs, and accordingly, the preparation method is also advantageous in being favorable for mass production, and is advantageous in terms of an eco-friendly process. When a surfactant is used, the surfactant surrounds the surface of the particle, so that a post-process of removing the surfactant is needed because there is a problem in that the reactants are not easily accessed when the surfactant is used in a catalyst reaction. Accordingly, when the surfactant is not used, the preparation method has an effect of reducing costs, and is also favorable for mass production because the process is simplified.

According to an exemplary embodiment of the present specification, the core-shell nanoparticles may have a particle diameter of 3 nm or more and 10 nm or less. Specifically, according to an exemplary embodiment of the present specification, the core-shell nanoparticles may have a particle diameter of 3 nm or more and 7 nm or less.

According to an exemplary embodiment of the present specification, the core particles may have a particle diameter of 2 nm or more and 9 nm or less. Specifically, according to an exemplary embodiment of the present specification, the core particles may have a particle diameter of 2 nm or more and 5 nm or less.

According to an exemplary embodiment of the present specification, the Pt shell may have a thickness of 0.5 nm or more and 1.5 nm or less. Specifically, according to an exemplary embodiment of the present specification, the Pt shell may have a thickness of 0.7 nm or more and 1.2 nm or less.

According to an exemplary embodiment of the present specification, the Pt shell may have 1 or more and 4 or less Pt atomic layers. Specifically, according to an exemplary embodiment of the present specification, the Pt shell may have 2 or more and 3 or less Pt atomic layers.

An exemplary embodiment of the present specification provides a carrier-nanoparticle complex prepared by the preparation method.

The carrier-nanoparticle complex according to an exemplary embodiment of the present specification may be used while replacing existing nanoparticles in the field in which nanoparticles may be generally used.

The carrier-nanoparticle complex according to an exemplary embodiment of the present specification has a much smaller size and a wider specific surface area than the nanoparticles in the related art, and thus may exhibit better activity than the nanoparticles in the related art. Specifically, the carrier-nanoparticle complex according to an exemplary embodiment of the present specification may be used in the catalyst field.

Specifically, an exemplary embodiment of the present specification provides a membrane electrode assembly including an electrode catalyst layer which includes the carrier-nanoparticle complex and an electrolyte membrane.

Furthermore, an exemplary embodiment of the present specification provides a fuel cell including the membrane electrode assembly.

The fuel cell of the present specification includes a fuel cell generally known in the art. Specifically, the fuel cell may include: a stack including the membrane electrode assembly and a separator interposed between the membrane electrode assemblies; a fuel supply part for supplying fuel to the stack; and an oxidizing agent supply part for supplying an oxidizing agent to the stack.

MODE FOR INVENTION

Hereinafter, the present specification will be described in detail with reference to Examples for specifically describing the present specification. However, the Examples according to the present specification may be modified in various forms, and it is not interpreted that the scope of the present specification is limited to the Examples described below. The Examples of the present specification are provided to more completely explain the present specification to a person with ordinary skill in the art.

[Example 1]—Preparation of Carrier-Nanoparticle Complex 3 g of polyethylene imine (PEI, Mw: 1,800) was dissolved in 600 ml of water, and then 720 mg of carbon black which had not been pre-treated and 6 g of $KNO_3$ were added thereto, and the resulting mixture was stirred for 24 hours. Thereafter, the mixture was washed with distilled water and dried to obtain a carbon carrier coated with PEI. As a result of an elemental analysis, the content of N in the carbon carrier was 2 wt %, meaning that the carrier was smoothly coated with the PEI polymer.

After 0.096 mmol of $Na_2PdCl_4$, 0.065 mmol of $CoCl_2$, and 65 mg of the carbon carrier coated with PEI were dissolved in 25 ml of ethylene glycol, pH was adjusted to 11, and then the resulting solution was stirred for a predetermined time. Moreover, after the temperature was increased up to 160° C., the solution was stirred for 3 hours, and then cooled to form Pd/Co core particles supported on the carbon carrier.

FIG. 1 illustrates an electron microscope photograph of Pd/Co core particles supported on a carbon carrier, which are prepared according to Example 1.

Moreover, after the Pd/Co core particles were washed with EtOH and dried, the resulting product was subjected to heat treatment at 220° C. for 1 hour, and then dispersed in 45 ml of distilled water, 0.096 mmol of Pt(NH$_3$)$_4$(NO$_3$)$_2$ was added thereto, pH was adjusted to 10, and then the resulting mixture was stirred for a predetermined time. Moreover, NaBH$_4$ being a reducing agent was added thereto at room temperature, and the resulting mixture was reacted for a predetermined time, and then washed with distilled water and dried to prepare a carrier-nanoparticle complex having core-shell nanoparticles supported on a carbon carrier.

FIG. 2 illustrates an electron microscope photograph of a carrier-nanoparticle complex in which core-shell nanoparticles are supported on the carbon carrier, which is prepared according to Example 1.

In Example 1, the Pd/Co core particles had a particle diameter of 2 nm to 5 nm, and the core-shell nanoparticles had a particle diameter of 3 nm to 6 nm.

As a result of an ICP analysis of the core-shell nanoparticles of the carrier-nanoparticle complex prepared according to Example 1, it was shown that Pt, Pd, and Co were 20.6%, 9.4%, and 2.6%, respectively.

FIG. 3 illustrates component analysis results of the core-shell nanoparticles of the carrier-nanoparticle complex, which is prepared according to Example 1, by using STEM EDS.

[Example 2]—Preparation of Carrier-Nanoparticle Complex 3 g of polyethylene imine (PEI, Mw: 1,800) was dissolved in 600 ml of water, and then 720 mg of carbon black which had not been pre-treated and 6 g of KNO$_3$ were added thereto, and the resulting mixture was stirred for 24 hours. Thereafter, the mixture was washed with distilled water and dried to obtain a carbon carrier coated with PEI.

After 0.096 mmol of Na$_2$PdCl$_4$, 0.11 mmol of CoCl$_2$, and 65 mg of the carbon carrier coated with PEI were dissolved in 25 ml of ethylene glycol, pH was adjusted to 11, and then the resulting solution was stirred for a predetermined time. Moreover, after the temperature was increased up to 160° C., the solution was stirred for 3 hours, and then cooled to form Pd/Co core particles supported on the carbon carrier.

FIG. 4 illustrates an electron microscope photograph of Pd/Co core particles supported on a carbon carrier, which are prepared according to Example 2.

Moreover, after the Pd/Co core particles were washed with EtOH and dried, the resulting product was subjected to heat treatment at 220° C. for 1 hour, and then dispersed in 45 ml of distilled water, 0.16 mmol of Pt(NH$_3$)$_4$(NO$_3$)$_2$ was added thereto, pH was adjusted to 10, and then the resulting mixture was stirred for a predetermined time. Moreover, NaBH$_4$ being a reducing agent was added thereto at room temperature, and the resulting mixture was reacted for a predetermined time, and then washed with distilled water and dried to prepare a carrier-nanoparticle complex having core-shell nanoparticles supported on a carbon carrier.

FIG. 5 illustrates an electron microscope photograph of a carrier-nanoparticle complex in which core-shell nanoparticles are supported on the carbon carrier, which is prepared according to Example 2.

In Example 2, the core-shell nanoparticles had a particle diameter of 4 nm to 7 nm.

As a result of an ICP analysis of the core-shell nanoparticles of the carrier-nanoparticle complex prepared according to Example 2, it was shown that Pt, Pd, and Co were 31.%, 8.7%, and 4.8%, respectively.

[Comparative Example 1]

A commercially available catalyst (JM40, Johnson Matthey Co., Ltd.) was used.

[Comparative Example 2]—Preparation of Carrier-Nanoparticle Complex by Using K$_2$PtCl$_4$ as Platinum Precursor 3 g of polyethylene imine (PEI, Mw: 1,800) was dissolved in 600 ml of water, and then 720 mg of carbon black which had not been pre-treated and 6 g of KNO$_3$ were added thereto, and the resulting mixture was stirred for 24 hours. Thereafter, the mixture was washed with distilled water and dried to obtain a carbon carrier coated with PEI. As a result of an elemental analysis, the content of N in the carbon carrier was 2 wt %, meaning that the carrier was smoothly coated with the PEI polymer.

After 0.096 mmol of Na$_2$PdCl$_4$, 0.065 mmol of CoCl$_2$, and 65 mg of the carbon carrier coated with PEI were dissolved in 25 ml of ethylene glycol, pH was adjusted to 11, and then the resulting solution was stirred for a predetermined time. Moreover, after the temperature was increased up to 160° C., the solution was stirred for 3 hours, and then cooled to form Pd/Co core particles supported on the carbon carrier.

Moreover, after the solution was washed with EtOH and dried, the resulting product was subjected to heat treatment at 220° C. for 1 hour, and then dispersed in 45 ml of distilled water, 0.16 mmol of K$_2$PtCl$_4$ was added thereto, pH was adjusted to 10, and then the resulting mixture was stirred for a predetermined time. Moreover, NaBH$_4$ being a reducing agent was added thereto at room temperature, and the resulting mixture was reacted for a predetermined time, and then washed with distilled water and dried to prepare a carrier-nanoparticle complex having core-shell nanoparticles supported on a carbon carrier.

FIG. 11 illustrates component analysis results of the core-shell nanoparticles of the carrier-nanoparticle complex, which is prepared according to Comparative Example 2, by using STEM EDS. Referring to FIG. 11, it can be confirmed that the synthesized particles do not have a core-shell structure. Accordingly, it can be seen that a Pt shell may be formed only when the reaction is performed under the same cationic Pt precursor and experimental conditions as in Examples 1 and 2.

[Experimental Example 1]—Evaluation of Catalytic Activity 30 mg of the carrier-nanoparticle complex prepared according to Example 1, 1.8 ml of isopropyl alcohol, and 257 mg of a 5 wt % Nafion solution were mixed and dispersed well to prepare a catalyst ink. A Nafion membrane (NR 211) was coated with the prepared catalyst ink by using a spray apparatus. After drying, the membrane was heated and compressed at 140° C. for 2 minutes and 30 seconds to manufacture a membrane electrode assembly.

By using the carrier-nanoparticle complex prepared according to Example 2, a membrane electrode assembly was manufactured by the method as described above.

Further, as Comparative Example 1, by using a commercially available catalyst (JM40, Johnson Matthey Co., Ltd.), a membrane electrode assembly was manufactured by the method as described above.

Furthermore, by using a membrane electrode assembly sample with a size of 2.5 cm×2.5 cm, H$_2$/Air was supplied under a 100% humidified condition, and the performances of a single cell were measured under a 75° C. atmosphere. The performance evaluation results of a membrane electrode assembly using the carrier-nanoparticle complexes according to Examples 1 and 2 and a membrane electrode assembly using the commercially available catalyst (JM40, Johnson Matthey Co., Ltd.) are shown in the following Table 1.

TABLE 1

|  | Pt + Pd mass per unit area (mgPtPd/cm$^2$) | Pt mass per unit area (mgPt/cm$^2$) | Current density (A/cm$^2$) | Activity per mass (A/mgPt) |
|---|---|---|---|---|
| Comparative Example 1 | 0.4 | 0.4 | 1.107 | 2.77 |
| Example 1 | 0.273 | 0.15 | 0.974 | 6.5 |
| Example 2 | 0.49 | 0.32 | 1.046 | 3.27 |

FIG. 6 illustrates a current density-voltage graph of Comparative Example 1, Example 1, and Example 2.

Furthermore, FIG. 7 is a normalization graph based on the amount of Pt per unit area in the graph in FIG. 6.

According to FIG. 7 and Table 1, even though the amount of Pt per unit area is small, the carrier-nanoparticle complex according to the Example exhibits a performance which is equivalent to that of the commercially available catalyst (Comparative Example 1), which uses 0.4 mgPt per unit area. That is, it can be seen that Pt is present only in the shell, and as a result, the Example may exhibit an equivalent performance even though Pt is used in a small amount, and exhibits high Pt activity as compared to Comparative Example 1 in which the commercially available catalyst is used.

[Experimental Example 2]—Evaluation of Catalyst Durability

The evaluation of the catalyst durability was carried out in a half cell system. As an electrode, a 3-electrode system, that is, a reference electrode, a counter electrode, and a working electrode were used, the reference electrode was Ag/AgCl, and as an electrolyte, a 0.5 M sulfuric acid solution or a 0.1 M perchloric acid solution was used.

Furthermore, scanning was performed 1000 times from −0.2 V to 1.0 V by using cyclic voltammetry, and the scan rate was 20 mV/s.

A catalyst ink was prepared by mixing 2 mg of the carrier-nanoparticle complex prepared according to Example 1 or a commercially available catalyst (JM40, Johnson Matthey Co., Ltd.), 8 μl of 5% Nafion, 1.6 ml of EtOH, and 0.4 ml of H$_2$O, and dispersing the resulting mixture by using an ultrasonic washing machine for 1 hour, and then the above-described electrode was coated with 20 μl of the catalyst ink, and the coating was dried. The amount of catalyst coated on the electrode was about 20 μg, and the area of the electrode was 0.196 cm$^2$.

FIG. 8 illustrates a graph of the catalyst durability evaluation performed by cyclic voltammetry in Example 1 and Comparative Example 1. The y-axis in FIG. 8 is an electric chemical surface area (ECSA), and means an active surface area of platinum, which is calculated by using the amount of hydrogen adsorbed onto the surface of platinum. Specifically, the ECSA may be calculated by the following Equation 1.

$$\text{ECSA} = Q / \{(210 \ \mu C/cm^2 Pt) \times M(g_{pt}/cm^2)\} \quad \text{[Equation 1]}$$

In Equation 1, Q means a quantity of electric charge (C/cm$^2$), and M means an amount of platinum per area of an electrode (gPt/cm$^2$).

Furthermore, the following Table 2 exhibits the catalytic activity according to the cycle of cyclic voltammetry.

TABLE 2

|  | JM 40 | Example 1 |
|---|---|---|
| 0 cycle | 76.97 m$^2$/cm$^2$ | 73.43 m$^2$/cm$^2$ |
| 1000 cycle | 23.78 m$^2$/cm$^2$ | 36.37 m$^2$/cm$^2$ |
| Rate in decrease | 69% | 50% |

According to FIG. 8 and Table 2, it can be seen that the carrier-nanoparticle complex according to the Example has a low rate in decrease of activity according the increase in number of cycles according to the cyclic voltammetry. That is, it can be seen that the carrier-nanoparticle complex according to the Example exhibits excellent durability.

[Reference Example 1]—Heat Treatment after Formation of Core-Shell 3 g of polyethylene imine (PEI, Mw: 1,800) was dissolved in 600 ml of water, and then 720 mg of carbon black which had not been pre-treated and 6 g of KNO$_3$ were added thereto, and the resulting mixture was stirred for 24 hours. Thereafter, the mixture was washed with distilled water and dried to obtain a carbon carrier coated with PEI.

After 0.096 mmol of Na$_2$PdCl$_4$, 0.11 mmol of CoCl$_2$, and 65 mg of the carbon carrier coated with PEI were dissolved in 25 ml of ethylene glycol, pH was adjusted to 11, and then the resulting solution was stirred for a predetermined time. Moreover, after the temperature was increased up to 160° C., the solution was stirred for 3 hours, and then cooled to form Pd/Co core particles supported on the carbon carrier.

Moreover, after the Pd/Co core particles were washed with EtOH and dried, the resulting product was dispersed in 45 ml of distilled water, 0.16 mmol of Pt(NH$_3$)$_4$(NO$_3$)$_2$ was added thereto, pH was adjusted to 10, and then the resulting mixture was stirred for a predetermined time. Moreover, NaBH$_4$ being a reducing agent was added thereto at room temperature, and the resulting mixture was reacted for a predetermined time, and then washed with distilled water and dried, and then subjected to heat treatment at 220° C. for 1 hour to prepare a carrier-nanoparticle complex having core-shell nanoparticles supported on a carbon carrier.

FIG. 9 illustrates XRD results of Example 2 and Reference Example 1. According to FIG. 9, it can be seen that the case of Example 2 in which core particles were subjected to heat treatment, and then a Pt shell was synthesized coincided with the XRD peak pattern of Pt, and the case of Reference Example 1 in which a Pt shell was synthesized, and then subjected to heat treatment coincided with the XRD peak pattern of a CoPt$_3$ alloy. This means that in the case of Reference Example 1, the metals of the core and shell are present in the form of an alloy on the surface thereof during the heat treatment process, and the structure of the Pt shell is collapsed.

[Reference Example 2]—Coating of Carrier with Polymer Having Skeleton Including Cyclic Molecule 2.5 g of polydiallyl dimethyl ammonium chloride (PDDA, Mw: 100,000 to 200,000) was dissolved in 50 ml of water, and then 720 mg of carbon black which had not been pre-treated and 6 g of KNO₃ were added thereto, and the resulting mixture was stirred for 24 hours. Thereafter, the mixture was washed with distilled water and dried to obtain a carbon carrier coated with PEI.

After 0.096 mmol of Na₂PdCl₄, 0.11 mmol of CoCl₂, and 65 mg of the carbon carrier coated with PEI were dissolved in 25 ml of ethylene glycol, pH was adjusted to 11, and then the resulting solution was stirred for a predetermined time. Moreover, after the temperature was increased up to 160° C., the solution was stirred for 3 hours, and then cooled to form Pd/Co core particles supported on the carbon carrier.

Moreover, after the Pd/Co core particles were washed with EtOH and dried, the resulting product was subjected to heat treatment at 220° C. for 1 hour, and then dispersed in 45 ml of distilled water, 0.16 mmol of Pt(NH₃)₄(NO₃)₂ was added thereto, pH was adjusted to 10, and then the resulting mixture was stirred for a predetermined time. Moreover, NaBH₄ being a reducing agent was added thereto at room temperature, and the resulting mixture was reacted for a predetermined time, and then washed with distilled water and dried to prepare a carrier-nanoparticle complex having core-shell nanoparticles supported on a carbon carrier.

A catalytic activity evaluation was performed on the carrier-nanoparticle complex prepared as described above in the same manner as in Experimental Example 1, and the result according to the evaluation is illustrated in FIG. 10. Specifically, FIG. 10 illustrates a current density-voltage graph of Reference Example 2. According to FIG. 10, it can be seen that the current density of Reference Example 2 at 0.6 V is 0.53 A/cm², which is much lower than those of Examples 1 and 2. From the result, it can be seen that the case where a carrier is coated with a polymer having a skeleton including a cyclic molecule shows a lower performance than that of a polymer having a straight or branched skeleton.

The invention claimed is:

1. A method for preparing a carrier-nanoparticle complex, the method comprising:
preparing a carbon carrier having a portion or all of a surface of the carbon carrier coated with a polymer comprising a cationic functional group;
forming core particles by reducing a solution comprising one or more metal precursors, the carbon carrier, and a polyol at a temperature of 120° C. or more and 220° C. or less to form metal core particles supported on the carbon carrier; and
forming core-shell nanoparticles by reducing an aqueous solution consisting of the metal core particles supported on the carbon carrier, a Pt precursor, and water at a temperature of 20° C. or more and 100° C. or less to form a Pt shell on a portion or all of the metal core particle surface,
wherein the core-shell nanoparticles are supported on the carbon carrier, and
the Pt precursor is represented by the following Chemical Formula 1:

   [Chemical Formula 1]

in Chemical Formula 1,
A is (NH₃), (CH₃NH₂), or (H₂O),
B is a monovalent anion,
m is 2, 4, or 6, and
n is any one integer of 1 to 7.

2. The method of claim 1, wherein the forming of the core particles includes adjusting pH of the solution to 9 or more and 11 or less.

3. The method of claim 1, wherein the forming of the core-shell nanoparticles includes performing reduction at a temperature of 20° C. or more and 30° C. or less.

4. The method of claim 1, wherein the polymer comprising the cationic functional group comprises one or more functional groups selected from a group consisting of an amine group, an imine group, and a phosphine group.

5. The method of claim 1, wherein the core-shell nanoparticles form a bonding structure with the cationic functional group.

6. The method of claim 1, wherein the polymer comprising the cationic functional group has a weight average molecular weight of 500 g/mol or more and 1,000,000 g/mol or less.

7. The method of claim 1, wherein the polymer comprising the cationic functional group is a polymer in which a straight or branched hydrocarbon chain is substituted with the cationic functional group.

8. The method of claim 1, wherein the metal core particles are bonded to cations of the polymer comprising the cationic functional group.

9. The method of claim 1, wherein in the forming of the core particles, the metal precursor is a precursor of one or more metals selected from a group consisting of Co, Ni, Fe, Pd, Ru, Cr, and Cu.

10. The method of claim 1, wherein B is NO₃⁻, NO₂⁻, OH⁻, F⁻, Cl⁻, Br⁻, or I⁻.

11. The method of claim 1, wherein in the forming of the core-shell nanoparticles, the Pt precursor is selected from the group consisting of Pt(NH₃)₄(NO₃)₂, Pt(NH₃)₄Cl₂, Pt(CH₃NH₂)₄(NO₃)₂, Pt(CH₃NH₂)₄Cl₂, Pt(H₂O)₄(NO₃)₂, and Pt(H₂O)₄Cl₂.

12. The method of claim 1, further comprising:
subjecting the core particles to heat treatment at a temperature of 150° C. or more and 400° C. or less prior to the forming of the core-shell nanoparticles.

13. The method of claim 1, wherein each step does not use a surfactant.

14. The method of claim 1, wherein the core-shell nanoparticles have a particle diameter of 3 nm or more and 10 nm or less.

15. A carrier-nanoparticle complex prepared by the method according to claim 1.

16. A membrane electrode assembly comprising:
an electrode catalyst layer which comprises the carrier-nanoparticle complex according to claim 15; and
an electrolyte membrane.

17. A fuel cell comprising:
the membrane electrode assembly according to claim 16.

* * * * *